United States Patent Office

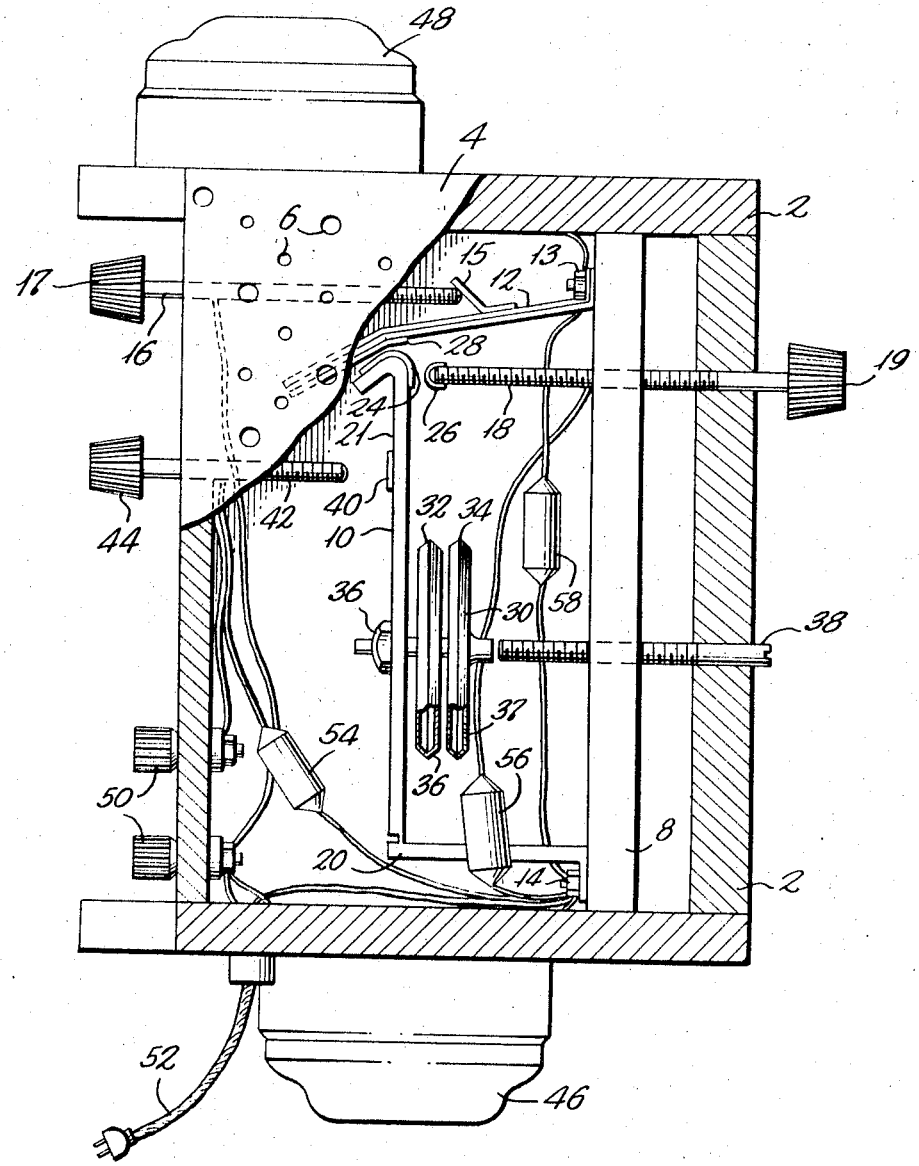

3,447,115
Patented May 27, 1969

3,447,115
MULTIPURPOSE THERMAL AUTOMATIC CONTROLLER WITH SINGLE THERMOMOTIVE ELEMENT
Tin Hwai Lai, 46 Kuangzu Road, Wuzu Shiang Taichung Hsien, Taiwan, China
Filed Oct. 12, 1966, Ser. No. 586,205
Int. Cl. H01h *37/36, 37/38*
U.S. Cl. 337—309                    4 Claims The invention relates to a multipurpose thermal controller and more particularly to a fluid operated thermal controller which is provided with a plurality of switching positions.

The thermal controller unit of the present invention, which is operative in response to changes in temperature, is adapted to control several temperature controlled appliances, for example, an air-conditioning unit, an electric fan and/or a heater. The thermal controller also includes a switch position which may be utilized to operate a fire control system. Although the controller unit will operate both heating and cooling appliances, it is constructed as a single self-contained unit. With this arrangement, the controller may be conveniently utilized for both heating and cooling functions without the necessity of additional installations.

The controller of the present invention overcomes the difficulties of time operated heating and cooling systems, where a heating or cooling unit operates for a preset time interval, by providing a continuous thermal control to maintain a selected temperature at a desired level. The automatic operation of the heating or cooling system results in efficient heating or cooling and thus decreases unnecessary power costs. This also results in a constant temperature level which is desirable from a health aspect.

In accordance with the present invention, a movable contact is operated by means of a liquid pressure-regulated pouch containing a thermally expansive liquid. The movable contact is adapted to cooperate with and complete an electrical circuit through one of three fixed contact positions. Each of the three fixed contact positions is adjustable to operate at various desired temperature levels. A housing is provided with at least two sockets to facilitate connection of heating and cooling units. Terminals are also provided through which a fire alarm signal may be transmitted.

Among the objects of the present invention therefore, are: the provision of a novel and highly effective thermal controller unit which is adapted to provide control of both a heating and cooling system; the provision of a controller unit which is adapted to provide a fire alarm indication; and the provision of a controller unit which includes a single contact member operable in response to changes in ambient temperatures through the expansion and contraction of a liquid cooperating with the movable contact member, to complete an electrical circuit through one of a plurality of fixed contact positions.

Other objects and further scope of applicability of the present invention will become apparent from the detailed description to follow, taken in conjunction with the accompanying drawings in which:

The single figure is a side view of the thermal controller unit.

As shown in the figure, the controller unit includes a frame 2 of wood or other non-conductive material and a side wall section 4 which is perforated with a plurality of holes 6 to insure passage of air into the interior of the unit. An insulating board 8 is used to mount a movable contact 10 and a fixed contact 12 by means of studs 13 and 14 which also act as wiring terminals.

The fixed contact 12 is adjustable through a member 15 integrally attached thereto which is moved by means of a rod 16 having an adjusting knob 17. A second fixed contact 18 is also adjustable by means of a knob 19. The fixed end of the movable contact 10 is pivoted at its connection point to a support 20. The free end 21 of the movable contact 10 is bent into an inverted V-shape which is adapted to contact either of the fixed contacts 12 or 18 depending upon its direction of travel. The movable contact 10 and the fixed contacts 12 and 18 are all provided with contact buttons 24, 26 and 28 which may be silver or the like. A hollow diaphragm 30 is fixedly attached to the movable contact 10 by nut and bolt assembly 36. The opposite side of the diaphragm 30 abuts an adjusting screw 38. The diaphragm 30 is comprised of two sections 32 and 34 of heat conductive material to form liquid chambers 36 and 37. The diaphragm 30 is fully filled with a liquid having a high expansion coefficient for example, mercury, alcohol or ether.

Movable contact 10 is also provided with another contact 40 which cooperates with a third fixed contact member 42. An adjusting knob 44 can be used to adjust the fixed position of the contact member 42.

Sockets 46 and 48 are provided (in series with contacts 10 and 12 and 10 and 18) for connection of heating and/or cooling equipment. Terminals 50 are provided in series with contacts 10 and 42 for the connection of additional external equipment, preferably fire alarm or similar apparatus. A suitable cord connector 52 is utilized to connect the unit to a power supply. Capacitors 54, 56 and 58 are connected in parallel across the contact points to eliminate arcing.

The operation of the unit may be described as follows. Contacts 18, 12 and 42 may be adjusted according to the desired temperature limits. Adjusting screw 38 can also be regulated to any desired ambient condition. During normal operation, only fixed contacts 18 and 12 will operate. An air-conditioning unit or fan may be electrically connected to socket 48 and a heating or similar unit may be connected to socket 46. As the temperature rises, the liquid within the diaphragm 30 expands and moves the movable contact 10 so that a circuit is completed between the movable contact 10 and the fixed contact 12, to complete a circuit through the air-conditioning unit. As the ambient temperature decreases, the liquid contracts and the contact is broken. Should the temperature then become too low, a further compression of the liquid will cause the movable contact member 10 to engage contact 18 which completes a circuit to a heating unit attached through socket 46.

By way of specific example, the adjusting screw 38 or the position of rod 16 may be adjusted so that the air-conditioning unit will become operable at about 30° C. Similarly, adjusting screw 38 or the position of contact 18 can be adjusted so that the heater will become operable at about 10° C.

During an overloaded heat condition such as would occur during a fire, the room temperature will rise above a preset level, for example 38° C. The liquid within the diaphragm 30 will expand and thereby move the movable contact 10 past and out of contact with the fixed contact 12 to complete a circuit with the contact 42. With a conventional fire alarm device connected across the terminals 50 an indication of the high heat condition will be given. It is immaterial to the operation of the third fixed contact position whether a heating or cooling system is connected to the other contacts 12 and 18 through the sockets 46 and 48, since the circuit to the fire alarm device connected to terminals 50 is separate.

It is obvious that various combinations of cooling and heating as well as fire alarm protection may be utilized with the present invention by varying the type of equipment which is attached to the controller circuits. Similarly, the invention is not limited to air-conditioning or heating applications but may be used wherever it is desired to operate apparatus in response to changes in temperature.

Obviously, numerous modifications and variations of the present invention are possible in light of the above teachings. It is therefore to be understood, that within the scope of the appended claims, the invention may be practiced other than as specifically described herein.

What is claimed is:

1. A temperature responsive automatic controller unit adapted to complete one of a plurality of circuits for controlling the operation of appliances, said unit comprising: a mounting means, a movable contact member having one end pivotally supported by said mounting means and a movable free end, said free end of said movable contact member having a plurality of contacts, a plurality of fixed contact members attached to said mounting means, means for adjusting each of said fixed contacts to operate at various temperature levels, each one of said fixed contact members being adapted to complete an electrical circuit with one of said contacts on said movable contact member and an expansible bellows unit filled with thermally responsive material, said bellows unit being mounted solely on said movable contact member whereby expansion and contraction of said material within said bellows unit in response to changes in temperature causes movement of said movable contact member with respect to said fixed contact members.

2. The temperature responsive automatic controller unit of claim 1 wherein said bellows unit includes a free end portion to abut said mounting means and a supported end portion fixed to said movable contact member, whereby said mounting means prevents movement of said bellows unit in the direction of said free end and causes movement in the direction of said supported end.

3. The temperature responsive automatic controller unit of claim 2 whereby said supported end of said bellows unit is fixed near said one end of said movable contact member whereby small movements of said bellows unit cause substantially greater movement in the free end of said movable contact member.

4. The temperature responsive automatic controller unit of claim 3 further including an adjusting screw on said mounting means, said adjusting screw being positioned to abut and thus limit the movement of said free end portion of said bellows unit, whereby the location of said adjusting screw determines the sensitivity of said movable contact member.

References Cited

UNITED STATES PATENTS

| | | | |
|---|---|---|---|
| 1,827,137 | 10/1931 | Blome | 200—140 |
| 2,123,672 | 7/1938 | Du Bois | 200—140 |
| 2,209,193 | 7/1940 | Derby | 200—140 |
| 2,335,886 | 12/1943 | Reutter | 200—140 |
| 2,406,443 | 8/1946 | Stein | 200—140 |

BERNARD A. GILHEANY, *Primary Examiner.*

H. B. GILSON, *Assistant Examiner.*